(12) United States Patent
Ndzebet

(10) Patent No.: US 6,927,000 B2
(45) Date of Patent: Aug. 9, 2005

(54) OXAZOLINE SURFACTANT ANODE ADDITIVE FOR ALKALINE ELECTROCHEMICAL CELLS

(75) Inventor: Ernest Ndzebet, Middleton, WI (US)

(73) Assignee: Rayovac Corporation, Madison, WI (US)

(*) Notice: Subject to any disclaimer, the term of this patent is extended or adjusted under 35 U.S.C. 154(b) by 0 days.

(21) Appl. No.: 10/944,036

(22) Filed: Sep. 17, 2004

(65) Prior Publication Data

US 2005/0031956 A1 Feb. 10, 2005

Related U.S. Application Data

(63) Continuation of application No. 10/020,685, filed on Dec. 14, 2001, now abandoned.

(51) Int. Cl.$^7$ .............................. H01M 4/42; H01M 4/62
(52) U.S. Cl. ........................................ 429/229; 429/212
(58) Field of Search .................................. 429/212, 229

(56) References Cited

U.S. PATENT DOCUMENTS

| | | | |
|---|---|---|---|
| 3,336,145 A | | 8/1967 | Purcell |
| 3,389,145 A | | 6/1968 | Katz |
| 3,965,082 A | | 6/1976 | Jurisch |
| 4,489,144 A | * | 12/1984 | Clark ........................ 429/336 |
| 4,536,300 A | | 8/1985 | Kayser et al. |
| 4,617,242 A | | 10/1986 | Dopp |
| 4,758,374 A | | 7/1988 | Durr, Jr. et al. |
| 4,857,424 A | | 8/1989 | Larsen et al. |
| 5,382,482 A | | 1/1995 | Suga et al. |
| 5,407,500 A | * | 4/1995 | Forsberg et al. ................ 149/2 |
| 5,439,978 A | | 8/1995 | Parkinson et al. |
| 5,576,117 A | | 11/1996 | Morita et al. |
| 5,698,339 A | | 12/1997 | Kawakami |
| 5,721,065 A | | 2/1998 | Collien et al. |
| 5,721,072 A | | 2/1998 | Mototani et al. |
| 6,210,827 B1 | | 4/2001 | Dopp et al. |
| 6,255,021 B1 | * | 7/2001 | Kusumoto et al. ........... 429/328 |

FOREIGN PATENT DOCUMENTS

| | | |
|---|---|---|
| JP | 03071559 | 3/1991 |
| JP | 10083812 | 3/1998 |
| JP | 11054132 | 2/1999 |
| JP | 11054133 | 2/1999 |
| JP | 11181476 | 7/1999 |
| WO | WO 02/095850 A1 | 11/2002 |

OTHER PUBLICATIONS

International Search Report for PCT/US 02/39990 dated Oct. 8, 2004.

* cited by examiner

*Primary Examiner*—Gregg Cantelmo
(74) *Attorney, Agent, or Firm*—Senniger Powers

(57) ABSTRACT

According to the present invention an alkaline electrochemical cell can contain an anode having an anode active material, an alkaline electrolyte, a gelling agent and an oxazoline surfactant additive. The invention relates to an anode mix, to an anode containing the mix, and to an electrochemical cell containing the anode and to methods for making the anode mix, the anode and the cell. Performance improvements can be realized when the oxazoline surfactant is provided in the anode, which can include increased operating voltage, good high rate pulse capability, elimination of initial potential dip, good shelf life and reduced sensitivity to open circuit rest.

20 Claims, 2 Drawing Sheets

OXAZOLINE SURFACTANT ANODE ADDITIVE FOR ALKALINE ELECTROCHEMICAL CELLS

CROSS-REFERENCE TO RELATED APPLICATIONS

This application is a continuation of prior application Ser. No. 10/020,685 filed Dec. 14, 2001, now abandoned the disclosure of which is hereby incorporated by reference as if set forth in its entirety herein.

STATEMENT REGARDING FEDERALLY SPONSORED RESEARCH OR DEVELOPMENT

Not applicable.

BACKGROUND OF THE INVENTION

The demand for very small electrochemical cells has increased with increased use of small, electrically-powered devices, and alkaline and alkaline metal-air electrochemical cells are an increasingly popular choice for powering such devices as hearing appliances and computers. Metal air cells contain an anode and an oxygen cathode, with the oxygen usually obtained from ambient air. The oxygen cathode catalytically promotes the reaction of oxygen with an aqueous neutral or alkaline electrolyte and is not consumed or changed during discharge. As the cathode is extremely compact yet has essentially unlimited capacity, very high energy densities are achieved, resulting from the increased available volume for the anode active material. Consequently, a metal-air cell can provide more watt-hours of electromotive force than a so-called "two-electrode cell" of similar cell size, mass and anode composition that contains both anode- and cathode-active materials inside the cell structure. Metal-air cells have an advantageous watt-hour capacity/mass ratio without regard to size or configuration, which can be, e.g., button cells as in, for example, U.S. Pat. No. 5,721,065 ("the '065 patent"), or cylindrical cells as in, for example, U.S. Pat. No. 6,210,827 (the '827 patent"), each incorporated by reference in its entirety as if set forth herein.

A typical metal air cell such as a zinc air cell contains an anode that includes a zinc alloy powder, a carbon-based air cathode and an alkaline electrolyte with a gelling agent to prevent the electrolyte from creeping through the cell seals. For efficient operation, the anode of a zinc air cell should participate only during current-generating reaction periods. In reality, though, corrosive shelf-discharge side reactions in the alkaline electrolyte can reduce both service and shelf life of alkaline electrochemical systems that use zinc as the anode active material. Much effort has been directed to improving electrochemical reaction efficiency and cell output. Previously, mercury was added to cell anodes to improve corrosion resistance. In recent years, mercury has been replaced by substances that conform to environmental requirements. Small amounts of metals such as lead, indium, and bismuth, and combinations thereof, can effectively improve corrosion behavior of anodic zinc. Certain organic surfactants can provide effective corrosion-inhibiting effect at the metal surface while making the anode sufficiently available for electrochemical oxidation that the cell output can be maintained under heavy cell loading. Surfactants can, like mercury, improve discharge capacity, service life and shelf life, without substantial adverse environmental impact. U.S. Pat. No. 4,857,424 ("the '424 patent") incorporated by reference herein as if set forth in its entirety, discloses reduced-mercury or mercury-free zinc-manganese dioxide cells containing an organosiliconate type surfactant. Also, the '065 patent discloses a button cell having an anode mix containing zinc metal powder, indium or other compounds, optionally a low level of mercury, a gelling agent and preferably a hydroxyethylcellulose surfactant. The anode disclosed therein sustains longer periods of power production at a relative steady voltage of at least 1.1 volts while protecting the anode metal from corrosion in the alkaline environment.

Similarly, the '827 patent discloses a cylindrical cell having an anode mix containing electrolyte, a gelling agent, particulate zinc, zinc oxide, additives and an organic surfactant comprising hydroxyethylcellulose.

Japanese Patent No. JP10083812 to Toshiba Battery Co. Ltd. discloses providing a high performance zinc alkaline battery containing 0.5–100 ppm of a fluorine-containing surfactant in a non-amalgamated-zinc-alloy-based gelled anode having a viscosity of 100,000 to 300,000 cPs at 25° C.

U.S. Pat. No. 5,382,482 concerns suppressing dendrites and shape change in an alkaline cell by disposing a cross-linked polymer film layer in close proximity to the anode active material, where the polymer film layer can contain, among other polymers, polyoxazoline. The patent does not describe including an oxazoline surfactant in the anode mix of the cell.

Further improvements in performance, such as increased operating voltage, improved discharge profile and reduced sensitivity to open circuit rest in alkaline electrochemical cells, preferably without sacrificing known benefits, are welcome and desired.

BRIEF SUMMARY OF THE INVENTION

The present invention discloses that an alkaline electrochemical cell having superior discharge performance and corrosion resistance includes an oxazoline surfactant additive in the cell anode. In one aspect, the present invention relates to an anode for use in a alkaline electrochemical cell, where the anode contains a metal anode active material, an anode electrolyte and an oxazoline surfactant. Optionally, the anode of the invention can include additional components known in the manufacture of alkaline electrochemical cells and anodes for same. In a related aspect, the invention relates to an alkaline electrochemical cell containing an anode of the invention. In another aspect, the present invention relates to methods for making an anode of the invention, or for making a cell containing the anode, as are detailed below.

It is an object of the invention to improve discharge performance and corrosion resistance without sacrificing the known benefits of adding surfactants to alkaline cell anodes.

It is a feature of the invention that the anode, and an electrochemical cell containing the anode, contain an oxazoline surfactant that can coat at least a portion of the particles of the anode active material.

It is an advantage of the present invention can maintain known benefits of anode surfactants, and can provide additional benefits that can include improved discharge efficiency at low and high rates, high operating voltage, lack of initial potential dip, and reduced sensitivity to open circuit rest.

Other objects, features and advantages of the present invention will become apparent in view of the following detailed description of the invention and the drawings.

DETAILED DESCRIPTION OF THE INVENTION

Figure 1:
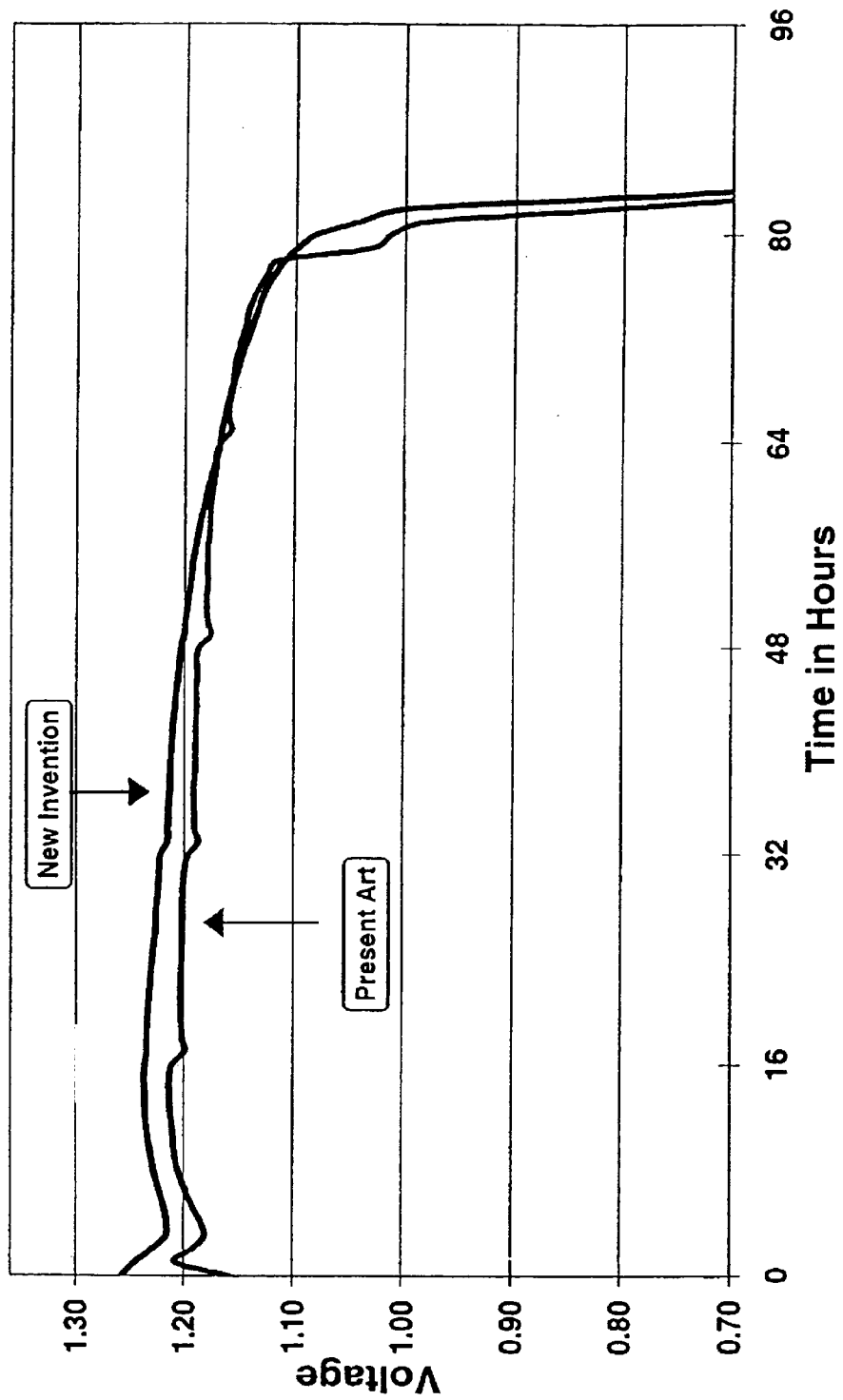
FIG. 1 compares the discharge profiles of cells of the invention containing an oxazoline surfactant and cells containing an organosiliconate surfactant. Discharge was at 374 Ohm for 16 hours/day at 70° F., 50 % relative humidity, after one month storage at 70° F.

The present invention relates to using an oxazoline-type surfactant, which can be a fatty oxazoline surfactant, as an additive for an alkaline electrochemical cell anode. Cells comprising the anode can exhibit improved electrical discharge performance, including higher operating voltage, good high rate pulse capability, no initial potential dip and reduced sensitivity to open circuit rest in comparison to cells that use other surfactants.

Oxazoline-type surfactants can be added to anode materials of any alkaline metal-anode electrochemical cells to improve discharge performance and to improve discharge capacity, service-life, and shelf life. While the invention was exemplified with metal-air anodes and cells, more particularly in zinc-air cells, the invention can be employed in metal-containing anodes generally, more particularly in zinc anodes, and in cells containing same. Suitable chemistries include, but are not limited to, zinc-air, zinc-manganese dioxide, zinc/AgO and zinc/Ag$_2$O systems, without regard to size or configuration. Preferable cells are of standard configurations, such as button cells, cylindrical cells and prismatic cells, which are available in a variety of standard sizes. For example, oxazoline type-surfactants can be substituted for the surfactants described in incorporated U.S. Pat. Nos. 4,857,424, 5,721,065 and 6,210,827. The anode materials to which an oxazoline surfactant is added contain a metal powder, a gelling agent, and an electrolyte. The anode materials can also include other components including but not limited to mercury, indium, gallium, aluminum, lead, bismuth and calcium compounds, and combinations thereof, as disclosed, for example, in the '065 patent and in U.S. Pat. No. 5,721,072, also incorporated herein by reference as if set forth in its entirety.

In one aspect, the present invention relates to an anode mix that includes a metal powder suitable for an anode of an alkaline electrochemical cell, an electrolyte compatible with the anode metal, an oxazoline surfactant and a gelling agent. In another aspect, the present invention relates to an anode that includes the composition described above in a container for receiving the composition of matter. In still another aspect, the present invention relates to an alkaline electrochemical cell that contains the anode. The cell has a discharge voltage of at least 0.7 volts, preferably 1.0 volts, more preferably 1.1 volts and still more preferably 1.2 volts, during its service life.

In preferred embodiments, the metal powder is preferably about 55% to about 73% by weight of the anode, the electrolyte is about 27% to about 45% (by weight) in an aqueous solution, and the oxazoline surfactant is about 0.001% to about 5% (by weight), based on the weight of the particles of metal powder. The anode material generally also contains about 0.1% to about 0.5% of gelling agent, by weight based on the weight of active material, and between about 1% to about 4%, preferably about 2% of zinc oxide, by weight based on the weight of the electrolyte. In more preferred embodiments, the metal powder is a particulate zinc alloy powder and the electrolyte is potassium hydroxide.

In a related aspect, the present invention is a method of making an anode mix for use in the anode and in the cells of the invention, the method involving the steps of mixing a metal powder, a gelling agent, an oxazoline surfactant, and an electrolyte in the above-mentioned proportions. The order in which the components are combined is not critical, except insofar as when mixing the oxazoline surfactant with a liquid (namely, the electrolyte or the gelled electrolyte), the surfactant is preferably in a liquid state (e.g., melted). Alternatively, if the surfactant is mixed first with the metal powder or other dry components, it can be a solid. In one embodiment of the method, the gelling agent and the alkaline electrolyte are combined first to form a gelled electrolyte. Then, the oxazoline surfactant is added to the gelled electrolyte with agitation. Finally, the metal powder is combined with the surfactant-containing alkaline electrolyte to form the gelled zinc anode material which can be incorporated into the receiving container.

In another related aspect, the present invention is a method of making an alkaline electrochemical cell involving the step of incorporating the aforementioned inventive anode into an electrochemical cell, the process for making the cell being, apart from the composition of the anode, conventional as is shown, for example in U.S. Pat. No. 4,617,242, incorporated herein by reference as if set forth in its entirety.

A suitable oxazoline surfactant can be solubilized in an anode-compatible electrolyte and is a liquid or can be liquefied under the anode processing conditions. U.S. Pat. No. 3,389,145, incorporated by reference herein as if set forth in its entirety, discloses structures of one suitable set of oxazolines and processes for making same. Also suitable for use in the anode of the invention are substituted oxazoline surfactants having the structures shown in U.S. Pat. No. 3,336,145, in U.S. Pat. No. 4,536,300, in U.S. Pat No. 5,758,374 and in U.S. Pat. No. 5,407,500, each incorporated by reference herein as If set forth in its entirety, and mixtures of any of the foregoing. A most preferred oxazoline surfactant, ethanol, 2,2'-[(2-heptadecyl-4(5H)-oxazolylidine) bis (methyleneoxy-2.1-ethanedlyloxy)]bis, has a structure shown as Formula (I-2) in incorporated U.S. Pat. No. 5.407,500. This is a compound commercially available from Angus Chemical (Northbrook, Ill.) and sold under the trademark Alkaterge™ T-IV.

EXAMPLE

Zinc air cells according to the invention were built with an anode as described in incorporated U.S. Pat. No. 4,617,242, except that the oxazoline surfactant was substituted at 0.3%, relative to the alkaline electrolyte in test cells in place of the organosiliconate surfactant of the prior anode composition. The structure of the test and control cells was as described in incorporated U.S. Pat. No. 5,721,065.

Figure 2:
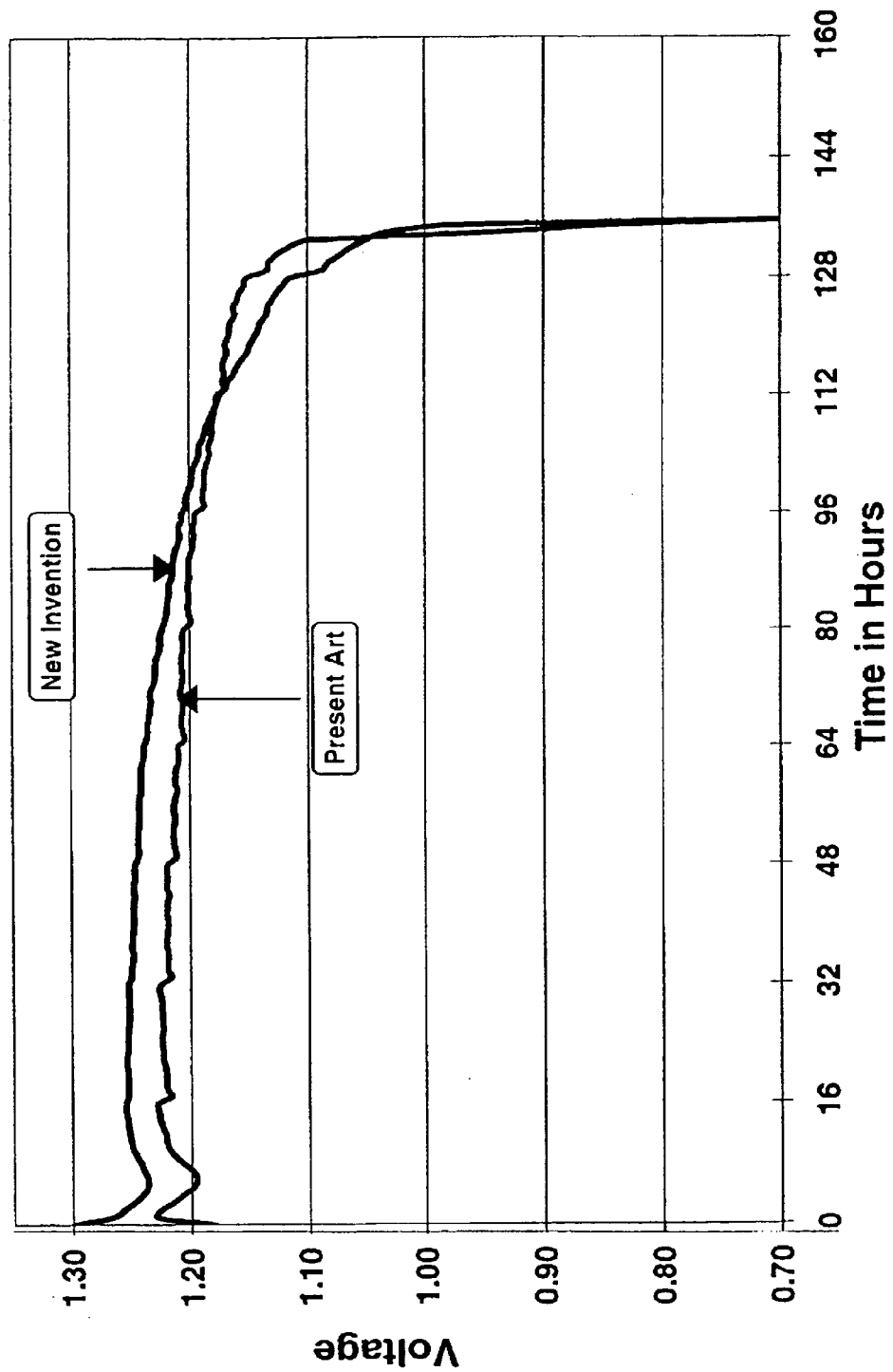
FIG. 2 compares the discharge profiles of cells of the invention containing an oxazoline surfactant and cells containing an organosiliconate surfactant. Discharge was at 620 Ohm for 16 hours/day at 70° F. 50 % relative humidity, after 20 days storage at 140° F.

The discharge characteristics of 13 size zinc air cells of the present invention containing an Alkaterge™ T-IV surfactant were compared against otherwise identical commercial cells having an organosiliconate surfactant in the anode. FIG. 1 illustrates the discharge curve at 374 Ohms after 1 month storage of cells at 70° F.; FIG. 2 shows the discharge curve at 620 Ohms after 20 days of storage at 140° F. As shown in FIGS. 1 and 2, cells containing oxazoline-type surfactant-based anodes exhibited operating voltage at least 5–10 mV higher than prior art cells during most of their usable live. In addition, the test cells did not exhibit an initial potential dip and were less sensitive to open circuit rest than otherwise comparable cells containing the organosiliconate type-surfactant.

Further, Table 1 shows discharge capacity values at 374 Ohms of test cells containing Alkaterge™ T-IV surfactant. The capacity of these cells was comparable to that of organosiliconate type surfactant-based cells before and after storage for one month at 70° F. 50% relative humidity, although discharge capacity before storage was comparatively lower in cells that contained Alkaterge™ T-IV surfactant.

TABLE 1

| | Discharge Capacity (mAh) at 1.1 Volt | | | |
|---|---|---|---|---|
| | Control | Alkaterge ™ T-IV Surfactant | Alkaterge ™ T-Surfactant | Alkaterge ™ E Surfactant |
| No Delay | 251 | 244 | 247 | N/A |
| One month | 252 | 252 | 198 | N/A |

Additionally, cells containing Alkaterge™ T-IV surfactants and control cells were also Stored for twenty days at 140° F., 50% relative humidity and were tested at 620 Ohms for 16 hours/day at 70° F., 50% relative humidity. Results of the two cell types were comparable (258 mAh v. 254 mAh, respectively).

Taken together these results demonstrate that oxazoline-type surfactants can effectively maintain cell capacity. Also, oxazoline-type surfactant based cells exhibited good high rate pulse capability as compared to the control cells.

I claim:

1. A primary alkaline electrochemical cell comprising an anode comprising an anode active material comprising zinc, an alkaline electrolyte, a gelling agent, and an oxazoline surfactant.

2. The primary alkaline electrochemical cell as set forth in claim 1 wherein the oxazoline surfactant is ethanol, 2,2'-[(2-heptadecyl-4(5H)-oxazolylidine) bis (methyleneoxy-2,1-ethanedlyloxy)]bis.

3. The primary alkaline electrochemical Cell as set forth in claim 1 wherein the oxazoline surfactant comprises a fatty side chain.

4. The primary alkaline electrochemical cell as set forth in claim 1 wherein the alkaline electrolyte is potassium hydroxide.

5. The primary alkaline electrochemical cell as set forth in claim 1 wherein the anode active material is particulate zinc powder.

6. The primary alkaline electrochemical cell as set forth in claim 1 wherein the oxazoline surfactant coats at least a portion of the anode active material.

7. The primary alkaline electrochemical cell as set forth in claim 1 wherein the oxazoline surfactant is present in an amount of from about 0.001% (by weight) to about 5% (by weight) of the weight of the anode active material.

8. A primary alkaline electrochemical cell comprising a cathode, an anode, and an alkaline electrolyte in electrical contact with the anode and the cathode, wherein the anode comprises an anode active material comprising zinc, a gelling agent, and an oxazoline surfactant.

9. The primary alkaline electrochemical cell as set forth in claim 8 wherein the oxazoline surfactant is ethanol, 2,2'-[(2-heptadecyl-4(5H)-oxazolylidine) bis (methyleneoxy-2,1-ethanediyloxy)]bis.

10. The primary alkaline electrochemical cell as set forth in claim 8 wherein the oxazoline surfactant comprises a fatty side chain.

11. The primary alkaline electrochemical cell as set forth in claim 8 wherein the electrolyte is potassium hydroxide.

12. The primary alkaline electrochemical cell as set forth in claim 8 wherein the anode active material is particulate zinc powder.

13. The primary alkaline electrochemical cell as set forth in claim 8 wherein the surfactant coats at least a portion of the anode active material.

14. The primary alkaline electrochemical cell as set forth in claim 8 wherein the oxazoline surfactant is present in an amount of from about 0.001% (by weight) to about 5% (by weight) of the weight of the anode active material.

15. The primary alkaline electrochemical cell as set forth in claim 8 wherein the cell has a discharge voltage of at least 0.7 volts during service.

16. The primary alkaline electrochemical cell as set forth in claim 8 wherein the cell has a discharge voltage of at least 1.0 volts during service.

17. The primary alkaline electrochemical cell as set forth in claim 8 wherein the cell has a discharge voltage of at least 1.1 volts during service.

18. The primary alkaline electrochemical cell as set forth in claim 8 wherein the cell has a discharge voltage of at least 1.2 volts during service.

19. A primary alkaline electrochemical cell comprising an anode comprising an anode active material comprising zinc, an alkaline electrolyte, a gelling agent, and an oxazoline surfactant, wherein the oxazoline surfactant is ethanol, 2,2'-[(2-heptadecyl-4(5H )-oxazolylidine) bis (methyleneoxy-2,1-ethanediyloxy)]bis, and wherein the oxazoline surfactant is present in an amount of from about 0.001% (by weight) to about 5% (by weight) of the weight of the anode active material.

20. A primary alkaline electrochemical cell comprising a cathode, an anode, and an alkaline electrolyte in electrical contact with the anode and the cathode wherein the anode comprises an anode active material comprising zinc, a gelling agent, and an oxazoline surfactant, wherein the oxazoline surfactant is ethanol, 2,2'-[(2-heptadecyl-4(5H)-oxazolylidine) bis (methyleneoxy-2,1-ethanediyloxy)]bis, and wherein the oxazoline surfactant is present in an amount of from about 0.001% (by weight) to about 5% (by weight) of the weight of the anode active material.

* * * * *

UNITED STATES PATENT AND TRADEMARK OFFICE
CERTIFICATE OF CORRECTION

.PATENT NO.   : 6,927,000 B2
DATED         : August 10, 2005
INVENTOR(S)   : Ernest Ndzebet It is certified that error appears in the above-identified patent and that said Letters Patent is hereby corrected as shown below:

Column 4,
Line 37, "as If set" should read -- as if set --.
Line 40, "(methyleneoxy-2. 1-ethanedlyloxy)] bis" should read -- (methyleneoxy-2, 1-ethanediyloxy)] bis --.
Line 64, "live" should read -- lives --.

Column 5,
Line 19, "also Stored for" should read -- also stored for --.
Lines 36-37, "(methyleneoxy-2, 1-ethanedlyloxy]bis" should read -- (methyleneoxy-2, 1-ethanediyloxy]bis --.

Signed and Sealed this

Twenty-eighth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,927,000 B2
DATED : August 9, 2005
INVENTOR(S) : Ernest Ndzebet

It is certified that error appears in the above-identified patent and that said Letters Patent is hereby corrected as shown below:

<u>Column 4,</u>
Line 37, "as If set" should read -- as if set --.
Line 40, "(methyleneoxy-2. 1-ethanedlyloxy)] bis" should read -- (methyleneoxy-2, 1-ethanediyloxy)] bis --.
Line 64, "live" should read -- lives --.

<u>Column 5,</u>
Line 19, "also Stored for" should read -- also stored for --.
Lines 36-37, "(methyleneoxy-2, 1-ethanedlyloxy]bis" should read -- (methyleneoxy-2, 1-ethanediyloxy]bis --.

This certificate supersedes Certificate of Correction issued March 28, 2006.

Signed and Sealed this

Second Day of May, 2006

JON W. DUDAS
*Director of the United States Patent and Trademark Office*